US012669868B1

(12) United States Patent
Lee et al.

(10) Patent No.: US 12,669,868 B1
(45) Date of Patent: Jun. 30, 2026

(54) MITIGATION TECHNIQUES FOR DEGRADATION STATES AT AN ARTIFICIAL REALITY SYSTEM

(71) Applicant: Meta Platforms Technologies, LLC, Menlo Park, CA (US)

(72) Inventors: Hae Jin Lee, Seattle, WA (US); Vikram Tank, Jersey City, NJ (US); Pol Pla I Conesa, Portland, OR (US); Roger Ibars Martinez, Seattle, WA (US); Timothy Matthew Otchy, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 673 days.

(21) Appl. No.: 18/174,943

(22) Filed: Feb. 27, 2023

(51) Int. Cl.
    *G06F 3/01*         (2006.01)
    *G06T 19/00*        (2011.01)
(52) U.S. Cl.
    CPC .............. *G06F 3/015* (2013.01); *G06F 3/014* (2013.01); *G06T 19/006* (2013.01)

(58) Field of Classification Search
    CPC ........ G06F 3/015; G06F 3/014; G06T 19/006
    USPC .......................................................... 714/5.1
    See application file for complete search history.

(56) References Cited

U.S. PATENT DOCUMENTS

2023/0281938 A1*   9/2023   Yan ......................... G06F 3/017
                                                          345/633

* cited by examiner

*Primary Examiner* — Yair Leibovich
(74) *Attorney, Agent, or Firm* — Morgan, Lewis & Bockius LLP

(57) ABSTRACT

Aspects of the present disclosure are directed to detecting and mitigating a degradation state at an artificial reality system. An artificial reality (XR) system can comprise several different input channels. The performance of one or more of these input channels, or channel fidelity, can degrade over time, such as in the presence of different operating conditions. Implementations can perform mitigation workflows to improve the channel fidelities of various input channels. When channel fidelity is improved, the input channel may be maintained as an active channel for receiving one or more types of user input. When channel fidelity is not improved, one or more other input channel(s) can be selected as the active channel(s) (e.g., replacement input channels) for receiving one or more types of user input.

20 Claims, 13 Drawing Sheets

100

101
102
103

Input Devices 120

Display 130

Other I/O 140

Processors 110

Memory 150

Program Memory 160

Operating System 162

State Mitigation Manager 164

Other Applications 166

Data Memory 170

500A

506 Eye tracking
508 Hand tracking
510 EMG signals
512 Hand-held controller
514 Touch input
516 Head gaze input
518 Voice input 502
504
504

900

MITIGATION TECHNIQUES FOR DEGRADATION STATES AT AN ARTIFICIAL REALITY SYSTEM

TECHNICAL FIELD

The present disclosure is directed to detection and mitigation of degradation states at an artificial reality system.

BACKGROUND

Artificial reality systems have grown in popularity with users, and this growth is expected to accelerate. Artificial reality systems often include a number of input types for a user. For example, different portions of the user's body can be tracked to detect movement and/or positioning, and this tracking can be used to control the user's interactions with a displayed artificial reality environment. Other examples include affiliated devices, such as hand-held controllers, that provide user input. Artificial reality systems can also operate in a variety of different conditions, including different environmental conditions, with or without various affiliated devices (e.g., hand-held controllers, different types of head-mounted displays, wearable sensors, etc.), and the like. This results in a large number of variations when it comes to how a user interacts with the artificial reality system and related display elements.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
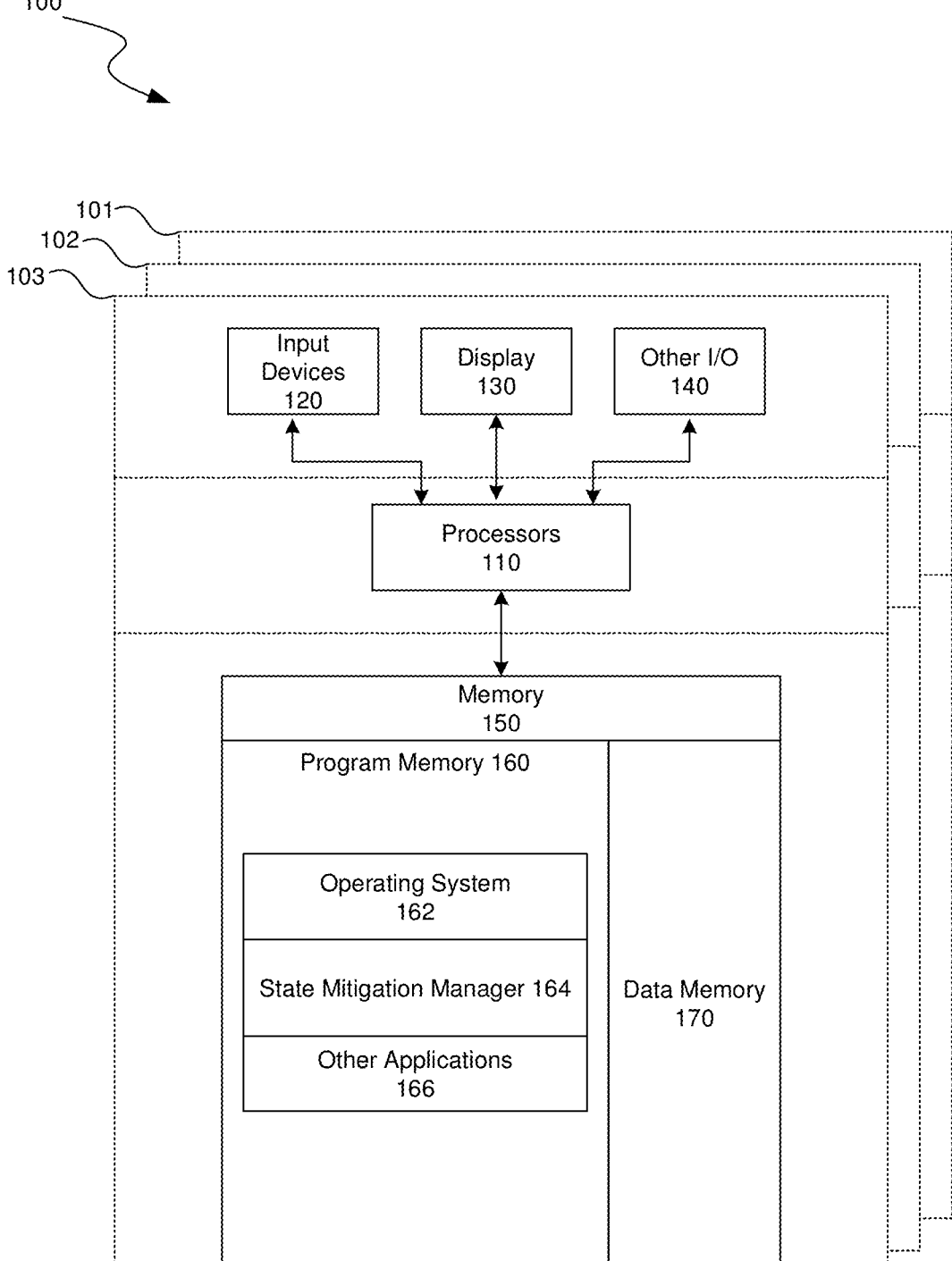
FIG. 1 is a block diagram illustrating an overview of devices on which some implementations of the present technology can operate.

Aspects of the present disclosure are directed to detecting and mitigating degradation state(s) at an artificial reality system. An artificial reality system can operate in a number of different conditions, such as in different light conditions, with different connected devices that comprise different operating conditions themselves (e.g., low battery, high temperature, moisture that interferes with sensors, etc.), under different user conditions (e.g., presence or absence of eyeglasses/contacts, etc.), and the like. Performance of different aspects of the artificial reality system can be impacted by these different operating conditions. Implementations can detect degradation states for an artificial reality system and mitigate such states to maintain effective performance and user experience.

For example, an artificial reality system can comprise several different input channels, such as eye tracking, computer vision hand tracking, neuromuscular sensor signal detection and lower arm tracking (e.g., via a wearable device, such as a wristband), hand-held controller movement tracking, touch-based input tracking (e.g., trackpad input), head gaze tracking, voice input, any combination thereof, or any other suitable input channel. The performance of one or more of these input channels, or channel fidelity, can degrade over time, such as in the presence of different operating conditions. Implementations can perform mitigation workflows to improve the channel fidelities of various input channels or work around degraded input. When channel fidelity is improved, the input channel may be maintained as an active channel for receiving one or more types of user input. When channel fidelity is not improved, one or more other input channel(s) can be selected as the active channel(s) (e.g., replacement input channels) for receiving one or more types of user input.

In an example, eye tracking can be selected as the input channel for a set of user input types. However, eye tracking performance can be susceptible to lighting conditions, user conditions, and other suitable operating conditions. Accordingly, eye tracking input channel fidelity may, at some point, degrade such that it fails to meet an eye tracking criteria. Implementations can perform one or more mitigation workflows, such as active eye tracking calibration, passive eye tracking calibration, and/or user instruction workflows, to improve the channel fidelity. When the eye tracking input channel fidelity is improved by the mitigation workflow(s), it can be maintained as the selection for the set of user input types. However, if eye tracking input channel fidelity is not improved by the mitigation workflows (e.g., the fidelity still fails to meet the eye tracking criteria), one or more other input channels can be selected for the set of user input types.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Conventional XR systems do not effectively detect and/or mitigate in the presence of degradation states. For example, a conventional XR system may permit different input channels based on available input devices, however these systems do not detect when input channel fidelity is poor and perform mitigation in such a state.

Implementations disclosed herein detect and mitigate against degradation states at an XR system to effectively maintain performance and user experience. For example, mitigation workflow(s) aimed to improve channel fidelity can be a first type of mitigation against degradation states. When such mitigation workflow(s) are unsuccessful, implementations perform a second type of mitigation by selecting new input channel(s) with a higher channel fidelity to maintain the user's experience with the XR system. In some implementations, the new input channel(s) are selected according to a priority so that the next best available input channel is selected.

Accordingly, implementations dynamically select device(s) and/or tracking software functionality, such as hand-held controllers, wrist bands, trackpads, eye tracking software functionality, hand tracking software functionality, lower arm tracking software functionality, etc., that achieve the most effective interaction between the XR system and the user. In addition, this selection occurs along with mitigation workflows that improve different user interaction channels. This multi-tiered approach to mitigating degradation states improves the functioning of the XR system itself.

Several implementations are discussed below in more detail in reference to the figures. FIG. 1 is a block diagram illustrating an overview of devices on which some implementations of the disclosed technology can operate. The devices can comprise hardware components of a computing system 100 that detect and mitigate of degradation states at an artificial reality system. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, state mitigation manager 164, and other application programs 166. Memory 150 can also include data memory 170 that can include, e.g., input channel calibration parameters, input device state data, display state information, channel fidelity criteria and/or thresholds, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
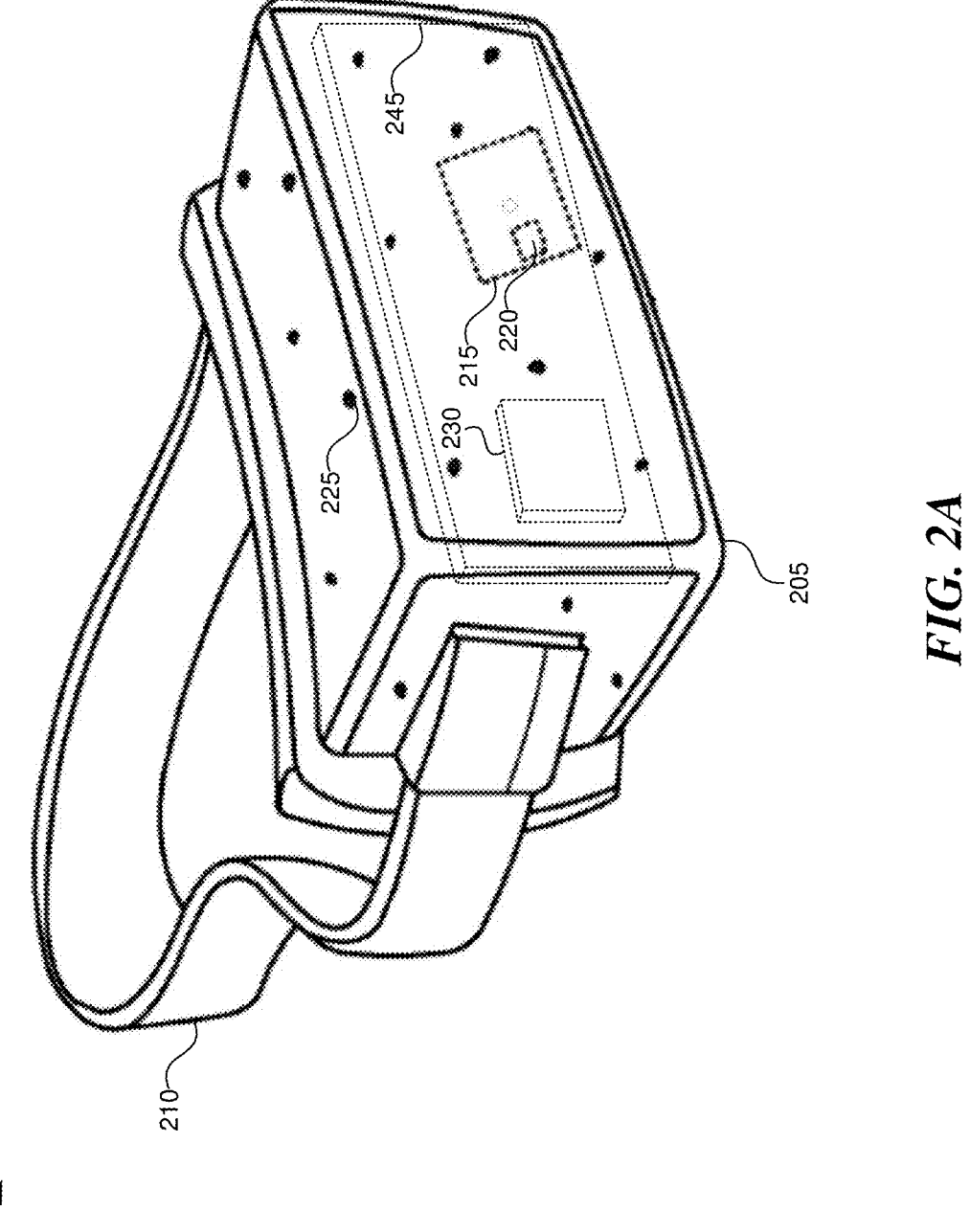
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
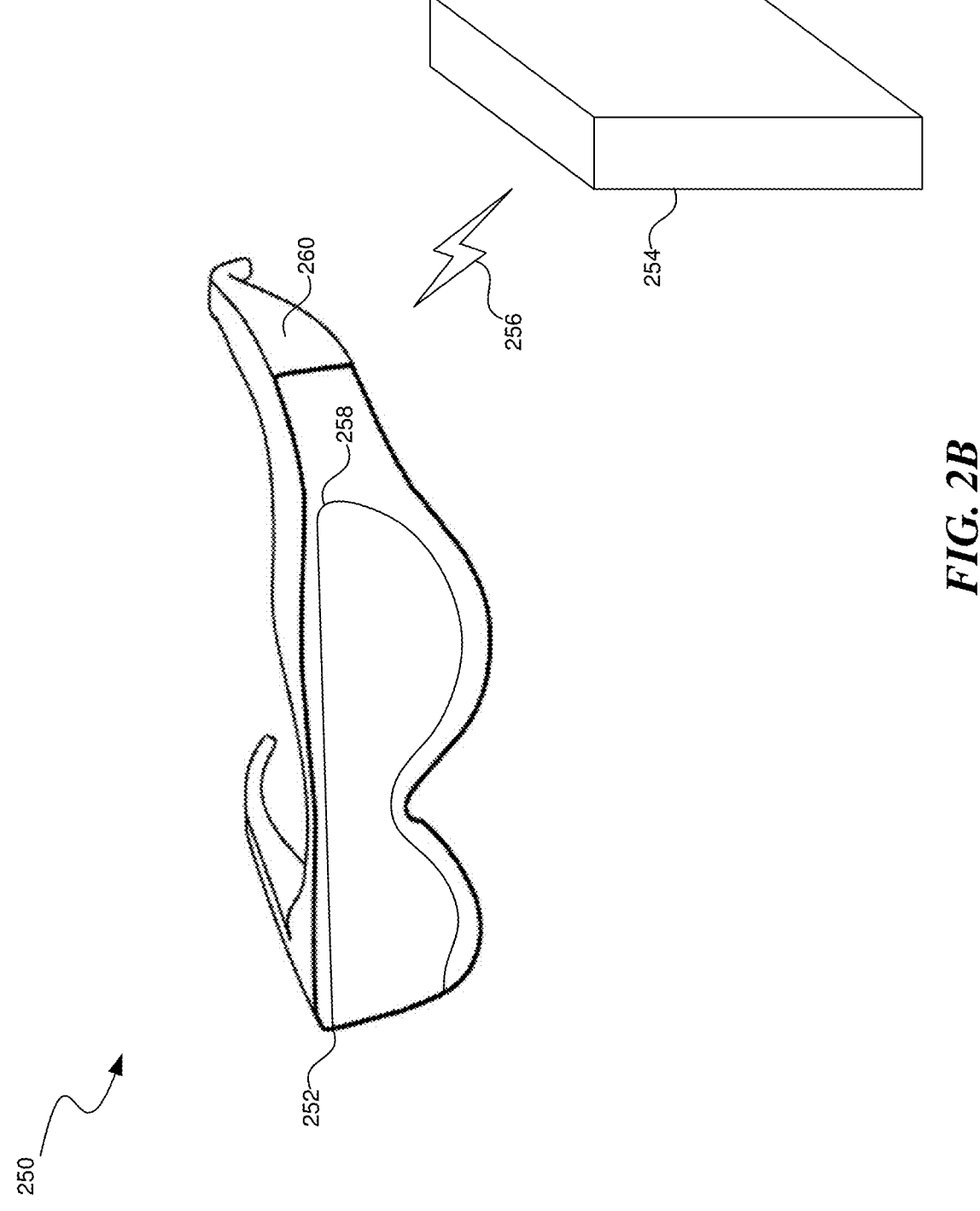
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
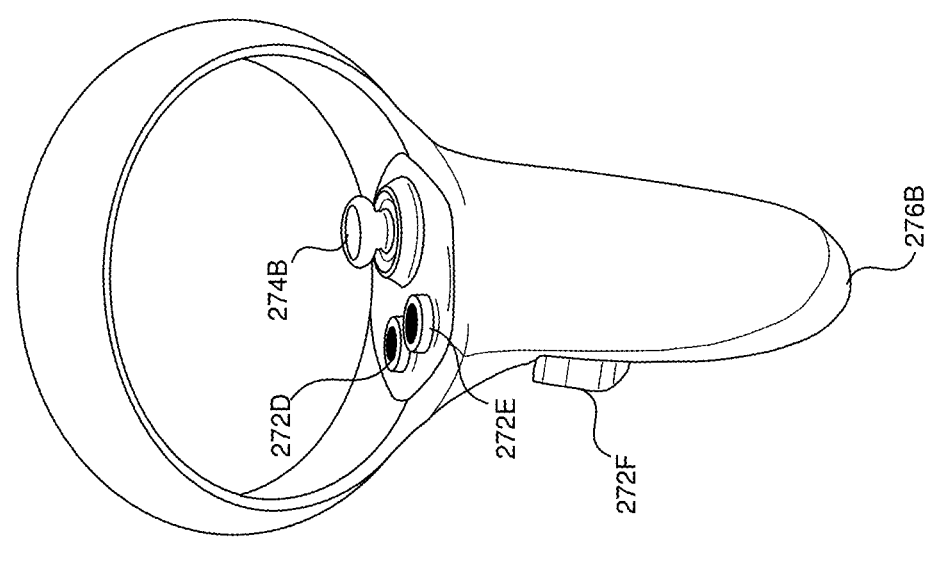
FIG. 2C is a wire diagram illustrating controllers which, in some implementations, a user can hold in one or both hands to interact with an artificial reality environment.
Figure 2C:
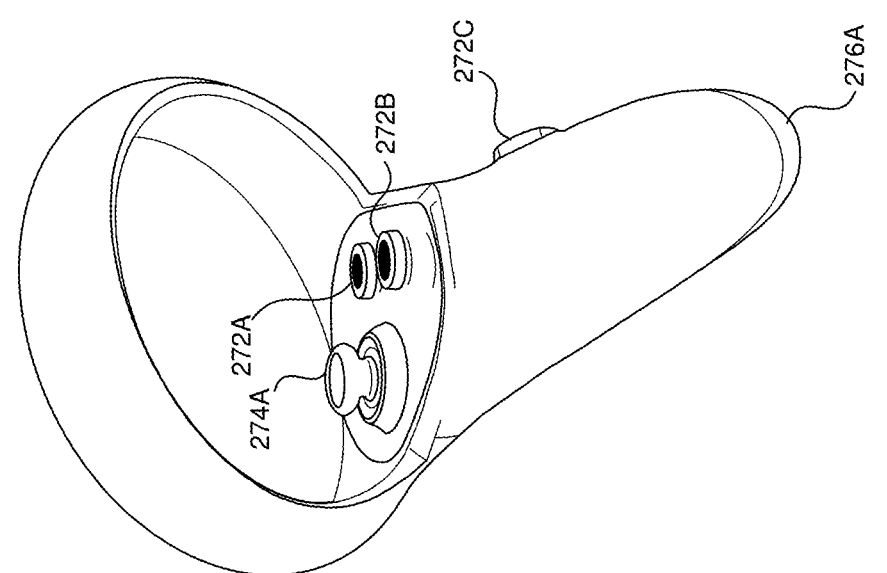
Figure 2C:
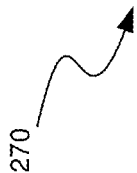

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
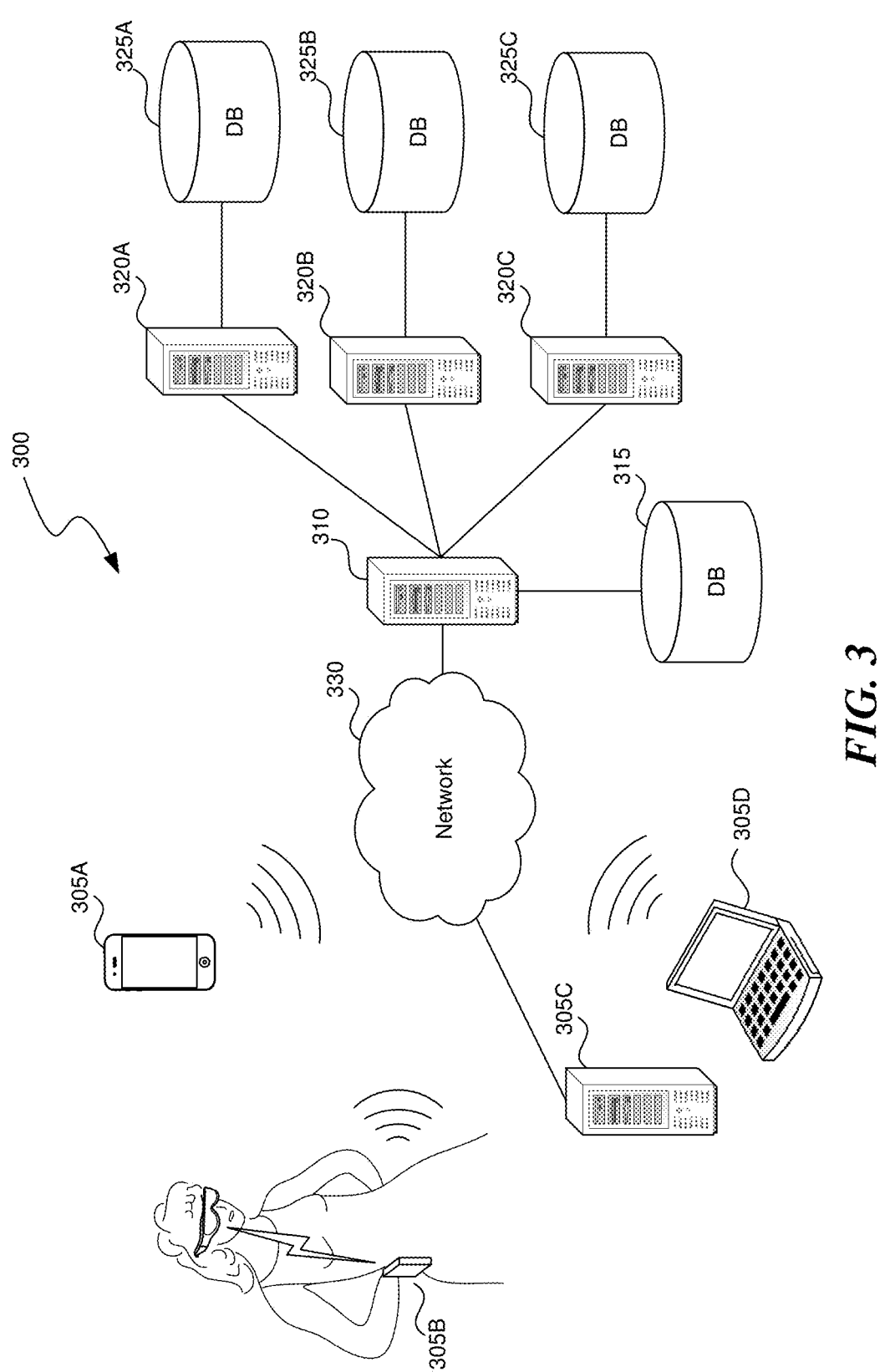
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
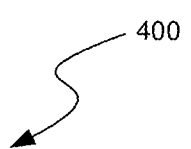
FIG. 4 is a block diagram illustrating components which, in some implementations, can be used in a system employing the disclosed technology.
Figure 4:
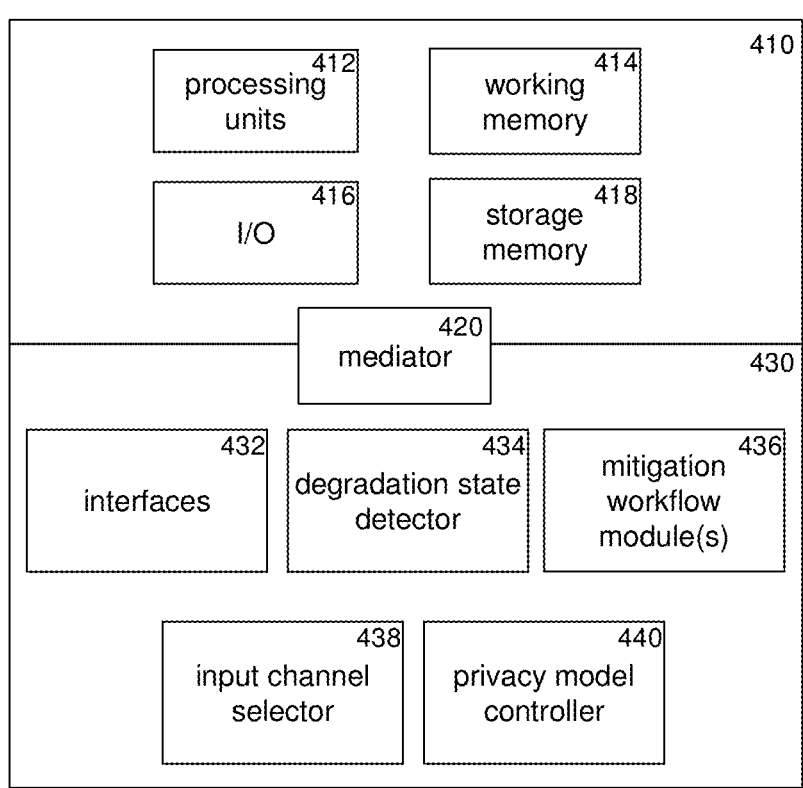

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for the detection and mitigation of degradation states at an artificial reality system. Specialized components 430 can include degradation state detector 434, mitigation workflow controller(s) 436, input channel selector 438, privacy model controller 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Degradation state detector 434 can detect degradation states for an XR system. Example degradation states include input channel fidelity degradation, unavailability of XR system device(s), environmental conditions that cause performance degradation, degraded battery state(s), etc. Input channel fidelity degradation can include detection of input channel performance below a criteria. Example input channels include eye tracking, computer vision hand tracking, neuromuscular sensor signal detection and lower arm tracking, hand-held controller movement tracking, touch-based input tracking (e.g., trackpad input), head gaze tracking, voice input, any combination thereof, or any other suitable input channel.

Degradation state detector 434 can detect when input channel fidelity fails to meet a performance criteria, for example when one or more eye tracking model(s) (e.g., machine learning models, etc.) output a confidence value below a threshold, resolved eye tracking is intermittent, resolved eye tracking includes fluctuations that exceed a variance criteria, and the like. For example, changes in lighting conditions, the presence or absence of eyeglasses, contact lenses, and/or synthetic eye lashes, and other suitable variations related to the user's eyes can result in degraded eye tracking performance.

In another example, degradation state detector 434 can also detect when computer vision hand tracking model(s) (e.g., machine learning models, etc.) output a confidence value below a threshold, resolved hand tracking is intermittent, resolved hand tracking includes fluctuations that exceed a variance criteria, intermittent capture of user hand(s) in the field of view of XR system cameras, and the like. For example, changes in lighting conditions, obstructions in a camera's field of view, changes to where the user positions the user's hands relative to the field of view of camera(s), and other suitable variations related to the user's hands can result in degraded hand tracking performance.

In another example, degradation state detector 434 can also detect when user input tracking via neuromuscular sensor signals comprises a confidence value below a threshold (e.g., user tracking models that receive, as input, neuromuscular sensor signals output a tracking with a confidence below a threshold), neuromuscular sensor signal detection and/or neuromuscular sensor device connection is intermittent, resolved user tracking via neuromuscular sensor signals includes fluctuations that exceed a variance criteria, and the like. In some implementations, the neuromuscular sensor may be worn by the user via a wearable device, such as a wristband, and conditions for input via the wearable device may deteriorate. For example, moisture between a neuromuscular sensor, such as an electromyography (EMG) sensor, and the user's skin can cause connection and signal detection degradation. In addition, dry skin or dirt/dust can result in degraded signal detection. Further, when the neuromuscular sensor(s) are worn by the user, the fit of the wearable device can impact signal detection. For example, a loose wristband may cause non-optimal contact between the user's skin and the neuromuscular sensor(s).

In another example, degradation state detector 434 can also detect when user input tracking via a trackpad (e.g., touch input) comprises a confidence value below a threshold (e.g., user tracking models that receive, as input, trackpad signals output a tracking with a confidence below a threshold), trackpad signal detection and/or trackpad device connection is intermittent, resolved user tracking via trackpad signals includes fluctuations that exceed a variance criteria, and the like. For example, a connection between a portable device (e.g., controller) that comprises the trackpad and the XR system may be unreliable and/or the battery for the portable device may be running low. Additional details on degradation state detector 434 are provided below in relation to FIGS. 5A, 5B, 5C, and blocks 902, 904, and 910 of FIG. 9.

Mitigation workflow module(s) 436 comprise software logic for performing mitigation workflow(s) at an artificial reality system in response to degradation state(s) detected by degradation state detector 434. For example, mitigation workflow module(s) 436 can include an eye tracking mitigation workflow performed by a calibration manager for configuring eye tracking calibration parameter(s). The XR system can include one or more camera(s), or other sensors, that capture the user's eyes while the user operates the XR system (e.g., wears a HMD of the XR system). Eye tracking model(s) can apply the eye tracking calibration parameter(s) to the captured signals to resolve a location (e.g., location in a XR environment displayed to the user) that corresponds to the user's eye state (e.g., where the user is looking).

Example eye tracking mitigation workflows include an active calibration and passive calibration. In active calibration, the user is displayed user interface elements (e.g., two-dimensional virtual objects) with known locations in a XR environment and the calibration manager can correct eye tracking calibration parameter(s) by instructing the user to look at the known locations of the user interface elements. In passive calibration, the user interface elements displayed in a XR environment to a user during a normal user workflow can comprise known locations. For example, a menu panel (e.g., two-dimensional virtual object) can include one or few virtual buttons (e.g., a submit button, continue button, accept button, etc.). Given the one or few options for the user to select, the calibration manager can predict resolved eye tracking nearby one of the few virtual buttons that correspond to the user's intention to select the nearby virtual button. Using the known location of the virtual buttons, the calibration manager can adjust the eye tracking calibration parameter(s) without explicit instruction for the user to look at certain portions of the XR environment.

Mitigation workflow module(s) 436 can also include eye tracking mitigation workflow(s) performed by a mitigation manager that instruct the user to perform certain actions. For example, the mitigation manager can display dialogue(s) (or other suitable notifications) that provide user guidance to improve eye tracking input channel fidelity. Example instructions include: "Make sure your glasses are clean and centered to your eyes. Significant change to your eyes (e.g., eyelash extension, special content lenses, etc.) may have also caused the poor eye tracking"; "Remove your glasses and make sure they are free of dust or hair"; "Make sure the distance between your glasses and your eyes is not too large"; "If you have extended your eye leashes or are wearing multifocal contact lenses, eye tracking could be unreliable. Please alter these conditions or a different input channel will be used for interactions;" and the like.

In some implementations, the mitigation manager can display one or more virtual buttons that trigger one or more mitigation workflow module(s) 436 and/or that trigger selection of a different input channel via input channel selector 438. For example, a dialogue can include a virtual button that triggers active eye tracking calibration, passive eye tracking calibration, or other suitable mitigation workflows. In some implementations, the dialogue can include a virtual button that permits the user to explicitly request a new input channel selection by input channel selector 438, for example when the user knows that certain conditions (e.g., wearing new contacts, wearing fake eyelashes, etc.) will not be adjusted.

Mitigation workflow module(s) 436 can also include a neuromuscular sensor signal mitigation workflow performed by the mitigation manager. For example, the mitigation manager can display dialogue(s) (or other suitable notifications) that provide user guidance to improve neuromuscular sensor signal input channel fidelity. Example instructions include: "Try to minimize the gap between your EMG wristband and your skin"; "Hydrating your skin may help increase EMG signal detection"; "EMG wristband battery low, consider recharging"; "EMG wristband disconnect"; "EMG wristband missing"; and the like. In some implementations, the mitigation manager can display one or more virtual buttons that trigger one or more mitigation workflow module(s) 436 and/or that trigger selection of a different input channel via input channel selector 438. In some implementations, the mitigation manager can display one or more virtual buttons that trigger one or more mitigation workflow module(s) 436 and/or that trigger selection of a different input channel via input channel selector 438. For example, the dialogue can include a virtual button that permits the user to explicitly request a new input channel selection by input channel selector 438, for example when the user knows that certain conditions (e.g., recharging the battery, improving neuromuscular sensor contact with skin, reconnecting neuromuscular sensor device, etc.) will not be adjusted.

Mitigation workflow module(s) 436 can also include a hand tracking mitigation workflow performed by the mitigation manager. For example, the mitigation manager can display dialogue(s) (or other suitable notifications) that provide user guidance to improve hand tracking input channel fidelity. Example instructions include: "Make sure you are in a space with adequate lighting"; "If you are facing a television or other display screen, try to face away from the screen or turn the screen off"; "Make sure that your hands are in full view of the cameras located on the headset;" and the like. In some implementations, the mitigation manager can display one or more virtual buttons that trigger one or more mitigation workflow module(s) 436 and/or that trigger selection of a different input channel via input channel selector 438. For example, the dialogue can include a virtual button that permits the user to explicitly request a new input channel selection by input channel selector 438, for example when the user knows that certain conditions (e.g., lighting, field of view of the camera(s), etc.) will not be adjusted.

Mitigation workflow module(s) 436 can also include a hand-held controller mitigation workflow performed by the mitigation manager. For example, the mitigation manager can display dialogue(s) (or other suitable notifications) that provide user guidance to improve hand-held controller input channel fidelity. Example instructions include: "Please connect your motion device"; "Please charge your motion device"; and the like. In some implementations, the mitigation manager can display one or more virtual buttons that trigger one or more mitigation workflow module(s) 436 and/or that trigger selection of a different input channel via input channel selector 438. For example, the dialogue can include a virtual button that permits the user to explicitly request a new input channel selection by input channel selector 438, for example when the user knows that certain conditions (e.g., connection for the hand-held controller, battery charging, etc.) will not be adjusted. Additional details on mitigation workflow module(s) 436 are provided below in relation to FIGS. 5A, 5B, 50, 8, and blocks 906 and 908 of FIG. 9.

Input channel selector 438 can select one or more input channels for user interactions with a XR environment, such as direct interaction user input (e.g., controlling collider objects), indirect interaction user input (e.g., driving a cursor in a XR environment), select user input, wake user input (e.g., wake XR system from inactive made, such as sleep, to active mode), scroll user input, pan user input (e.g., two-dimensional movement), move user input (e.g., three-dimensional movement), and any other suitable user interaction type with a XR environment. For example, based on the degradation state detected by degradation state detector 434, the mitigation workflow(s) performed by mitigation workflow module(s) 436, and the fidelity of the various input channels (after performance of mitigation workflow(s)), input channel selector 438 can select one or more of eye tracking, computer vision hand tracking, neuromuscular sensor signal detection and lower arm tracking, hand-held controller movement tracking, touch-based input tracking (e.g., trackpad input), head gaze tracking, and/or voice input for any suitable user interaction type. Additional details on mitigation input channel selector 438 are provided below in relation to FIGS. 5A, 5B, 5C, and blocks 910, 912, and 914 of FIG. 9.

Privacy model controller 440 can control the input channel(s) available to a XR system based on the user's selected preference for which device(s) and/or sensor(s) are permitted to participate during a user session with a XR system. For example, user preferences can disable XR system device(s) and/or sensor(s), such as camera(s), microphone(s), touch device(s), neuromuscular sensors/devices, and any other suitable devices or sensors. In some implementations, privacy mode controller 440 can determine which input channels (e.g., eye tracking input channel, hand tracking input channel, neuromuscular sensor input channel, hand-held controller input channel, touch device input channel, head gaze input channel, voice input channel, etc.) are available to control user interactions at the XR system given the permitted device(s) and/or sensor(s) defined by the user preferences, and provide these available input channels to input channel selector 438. For example, input channel selector 438 can select input channel(s) for user interaction types (e.g., user selection input, user scroll input, etc.) from among these available input channels.

Implementations detect and mitigate degradation states experienced by XR systems, for example due to operating conditions such as low battery, unstable device connectivity, environmental conditions (e.g., poor lighting, high or low temperatures, camera(s) field of view blockage, etc.), degraded calibration for user tracking (e.g., eye tracking, etc.), and the like. For example, operating conditions can change during sessions with a XR system (e.g., over a single session or multiple sessions). The various input channels that receive input from a user can experience changes in fidelity (e.g., degradation) under different operating conditions and over time, and implementations can perform detection and mitigation workflows to maintain a quality user experience in the face of such fidelity changes.

Figure 5A:
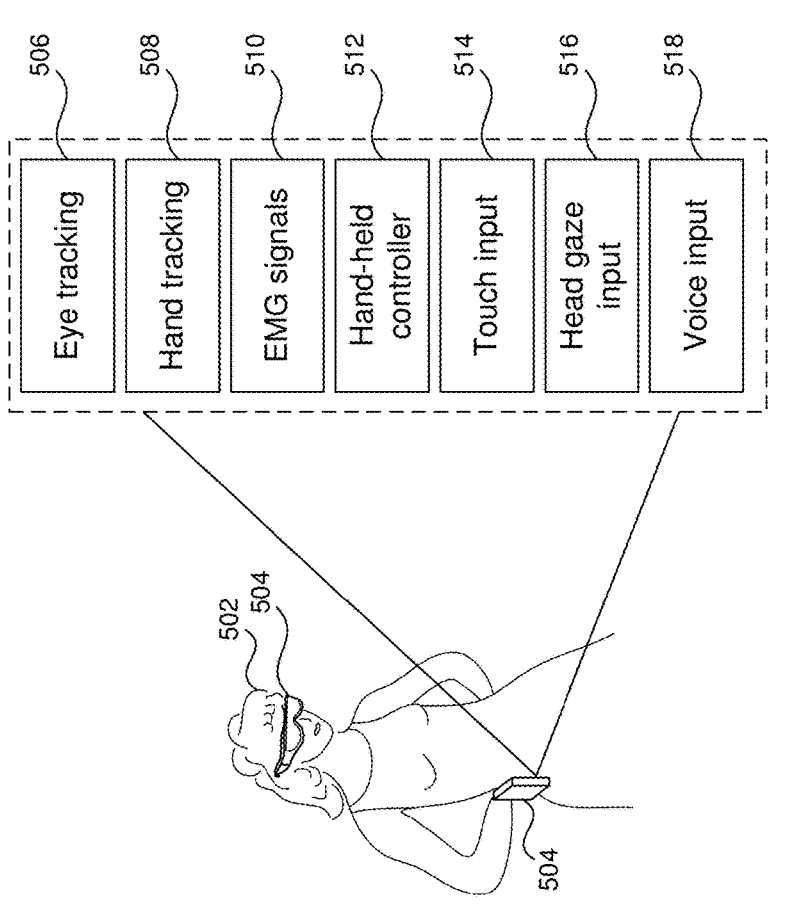
FIG. 5A is a conceptual diagram illustrating input channels of an artificial reality system.

FIG. 5A is a conceptual diagram illustrating input channels of a XR system. Diagram 500 includes user 502, XR system 504, eye tracking input channel 506, hand tracking input channel 508, neuromuscular sensor input channel 510, hand-held controller input channel 512, touch device input channel 514, head gaze input channel 516, and voice input channel 518. User 502 of XR system 504 can provide input via one or more of these input channels.

Eye tracking input channel 506 can represent user input (e.g., location in a XR environment) based on the tracked location of a user's eye(s), such as the location within the eye box (e.g., where the user is looking). For example, one or more cameras can capture the user's eyes, the captured images can be processed to determine relative locations of the user's eyes (e.g., pupil location), and these relative locations can be used to resolve where the user is looking within a XR environment displayed to the user via XR system 504.

Hand tracking input channel 508 can represent user input (e.g., direct interaction user input, indirect interaction user input, select user input, wake user input, scroll user input, pan user input, move user input, etc.). For example, one or more cameras can capture the user's hands, the captured images can be processed to determine relative locations of the user's hands, and these relative locations can be used to resolve corresponding locations within a XR environment displayed to the user via XR system 504. In some implementations, captured hand gestures can be resolved as a specific type of user input, such as selection input, scroll input, and the like.

Neuromuscular sensor input channel 510 can represent user input (e.g., direct interaction user input, indirect interaction user input, select user input, wake user input, scroll user input, pan user input, move user input, etc.) based on the tracked position/orientation of a user's lower arm (e.g., wrist and/or hand). For example, a band worn by the user can comprise neuromuscular sensors that detect signals representative of the user's lower arm position/orientation. The signals can be processed to track the user's lower arm position/orientation, and this position/orientation can be used to resolve corresponding locations within a XR environment displayed to the user via XR system 504. In some implementations, the lower arm position/orientation can be resolved as a specific type of user input, such as selection input, scroll input, and the like.

Hand-held controller input channel 512 can represent user input (e.g., direct interaction user input, indirect interaction user input, select user input, wake user input, scroll user input, pan user input, move user input, etc.) based on the tracked motion/movement of a hand-held controller that is part of XR system 504 and/or the state of button(s), joy stick(s), and/or other hand-held controller input elements. For example, user input can be resolved for hand-held controller input channel 512 via signals from (and/or captured images of) controllers 270, 276A, and/or 276B of FIG. 2C.

Touch input channel 514 can represent user input (e.g., direct interaction user input, indirect interaction user input, select user input, wake user input, scroll user input, pan user input, move user input, etc.) based on the touch input at a device of XR system 504 with a trackpad. For example, relative location(s) of the user's touch input on the trackpad can be used to resolve corresponding locations within a XR environment displayed to the user via XR system 504. In some implementations, user input at the trackpad can be resolved as selection input, such as a double click, and/or scroll input, such as multi-finger input.

Head gaze input channel 508 can represent user input (e.g., location in a XR environment, etc.) based on the tracked orientation of a user's head. For example, signals from motion sensors (e.g., accelerometer, gyroscope, inertial measurement unit (IMU), etc.) of a HMD that is part of XR system 504 can be processed to determine an orientation of the user's head, and this orientation can be used to resolve where the user is looking within a XR environment displayed to the user via XR system 504. For example, the HMD can be HMD 200 of FIG. 2A and/or HMD 252 of FIG. 2B.

Voice input channel 518 can represent user input (e.g., select user input, wake user input, scroll user input, pan user input, move user input, etc.) based on received user voice commands. For example, microphones of XR system 504 can detect audio from the user and process the audio to generate natural language predictions, such as via one or more transcription models. The natural language predictions can be processed by one or more natural learning processing models (e.g., machine learning models) to resolve voice command(s) issued by the user. For example, the resolved voice commands can map to types of user input, such as selection (e.g., select this element), scrolling (e.g., scroll up, scroll down, scroll left, scroll right, and the like.

In some implementations, input channel(s) interact with a XR environment via a ray-based interaction, such as neuromuscular sensor input channel 510, hand-held controller input channel 512, any combination thereof, or any other suitable input channel. A ray-based interaction can include a ray projection (i.e., straight line) from a control point along a casting direction. For example, the control point can be a palm, fingertips, a fist, a wrist, etc., and the casting direction can be along a line that passes through the control point and an origin point, such as a shoulder, eye, or hip. In other implementations, the control point can be based on other tracked body parts such as a user's eye, head, or chest. For example, the control point can be an estimated position of a center of a user's pupil and the origin point can be an estimated position of the center of a user's retina. In some cases, a graphical representation of the ray projection (the whole line or just a point where the ray hits an object) can be displayed in the artificial reality environment, while in other cases the ray projection is tracked by the XR system without displaying the ray projection. In various implementations, the ray projection can extend from the control point until it intersects with a first object or the ray projection can extend through multiple objects. In some implementations, the direction of the ray projection can be adjusted to "snap" to objects that it is close to intersecting or the ray projection can be curved up to a threshold amount to maintain intersection with such objects.

In some implementations, input channel(s) interact with a XR environment via virtual user hands, such as hand tracking input channel 508. Virtual user hands can be a virtual representation of the user's hands in a XR environment that can directly interact with XR environment elements, such as virtual objects.

Figure 5B:
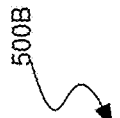
FIGS. 5B and 5C are conceptual diagrams illustrating input channels of an artificial reality system under differing environmental conditions.
Figure 5C:
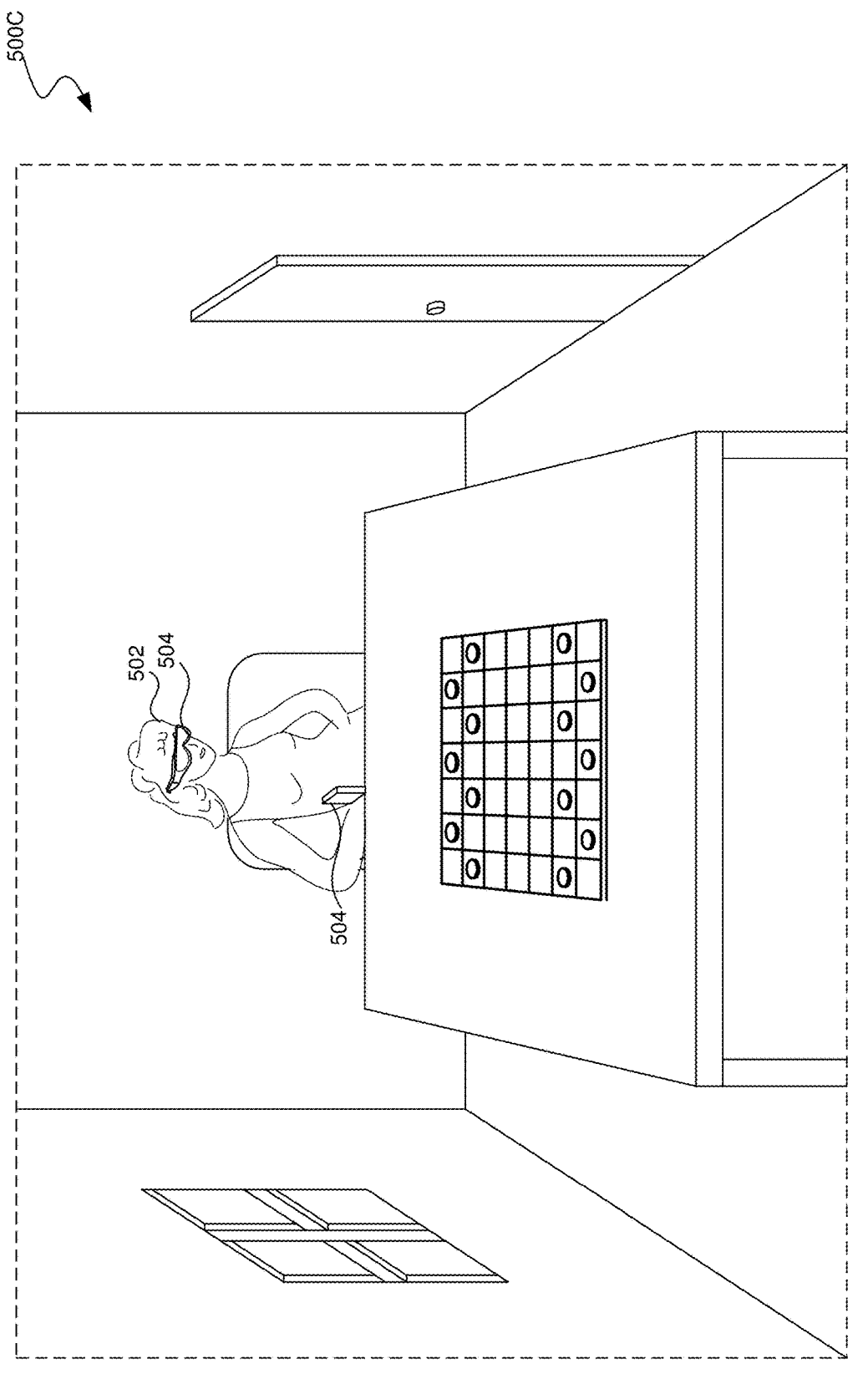

FIGS. 5B and 5C are conceptual diagrams illustrating input channels of an artificial reality system under differing environmental conditions. Environment 500B includes user 502, and artificial reality system 504. Environment 500C includes user 502, and artificial reality system 504. Environment 500B includes a first set of environment conditions and environment 500C includes a second set of environmental conditions that differ from the first set of environment conditions.

For example, environment 500B can be an outdoor environment with certain lighting conditions (e.g., direct sunlight), moisture conditions (e.g., humidity, rain, etc.), user activity levels (e.g., running, hiking, etc.), user skin conditions (e.g., dirt, moisture, etc.), and other suitable operating conditions. Input channel fidelity can vary under these conditions. For example, a change in lighting may cause eye tracking degradation and/or hand tracking degradation. In addition, moisture levels, dirt on the user's skin, and/or a loose wristband may cause degradation in the neuromuscular sensor input channel. Further, the battery on certain devices (e.g., controllers, touch devices, etc.) may run low or be fully drained.

On the other hand, environment 500C can be an indoor environment with different lighting conditions (e.g., indoor lighting, television/computer screens, etc.), moisture conditions (e.g., controlled humidity, no precipitation, etc.), user activity levels (e.g., user sitting or performing minimal activity), user skin conditions (e.g., lack of dirt and/or moisture), and other suitable operating conditions. Input channel fidelity can vary under these conditions. For example, a change in lighting may cause eye tracking degradation and/or hand tracking degradation. In addition, neuromuscular sensor input channel fidelity may improve after the user is indoors. Further, the battery on certain devices (e.g., controllers, touch devices, etc.) may be charged.

A user can move from environment 500B to environment 500C, environment 500C to environment 500B, or experience any other suitable operating condition change. As a result, input channel fidelity can fluctuate for various input channels, and implementations can perform mitigation workflow(s) and input channel selection given the detected input channel fidelities. For example, input channel(s) can be selected for various types of user input (e.g., direct interaction user input, indirect interaction user input, select user input, wake user input, scroll user input, pan user input, move user input, etc.), based on a priority ranking, user preferences, the detected fidelities of the input channels, or any combination thereof.

In some implementations, user input can be received via multiple of these input channels. For example, the input channel selected for direct interaction user input (e.g., collider interactions) can be different from the input channel selected for indirect interaction user input (e.g., controlling a cursor). In some implementations, when no input channel that supports direct interaction comprises a channel fidelity that meets a criteria, no input channel is selected for direct interaction user input, and the XR system can fallback to a combination of other user inputs, such as indirect interactions, user selection input, user scroll input, etc.

In some implementations, the eye tracking input channel can be selected for indirect interaction user input, however eye tracking may deteriorate until the fidelity no longer meets the eye tracking criteria. In this example, the selected input channel for indirect interaction user input can be neuromuscular sensor input channel, hand-held controller input channel, or a combination of these. In some implementations, the mechanism for the indirect interaction can be a hand ray projected from the user's tracked lower arm (e.g., hand and wrist), and one or both of the neuromuscular sensor input channel and hand-held controller input channel can support the hand ray projection. In another example, the selected input channel for indirect interaction user input can be the head gaze input channel, for example when the fidelity for one or both of the neuromuscular sensor input channel and hand-held controller input channel comprise a fidelity that fails to meet their respective criteria (e.g., neuromuscular sensor detection fails to meet a criteria due to environmental conditions, hand-held controller is missing, etc.).

In some implementations, when the eye tracking input channel is selected for indirect interaction user input, one or more other input channels can be selected for other user input types, such as select input, wake input, scroll input, pan input, and the like. For example, user gestures via the hand tracking input channel (e.g., finger flicks, finger push gestures, etc.) can provide scroll and/or selection input for user interface elements targeted via the eye tracking input channel. In some implementations, when the hand tracking input channel fidelity deteriorates such that it fails to meet the hand tracking criteria, an alternative input channel can be selected for user selection input and/or user scroll input, such as the hand-held controller input channel (e.g., button press or joystick for selection and/or scroll), touch device input channel (e.g., trackpad touch or double click for selection, double finger touch for scrolling, etc.), voice input channel (e.g., voice commands for selection, scroll, etc.), or any other suitable input channel. In this example, the eye tracking input channel can combine with other selected input channel(s), depending on the fidelities of these channels, to accomplish indirect user interactions along with selection and/or scroll user input.

In some implementations, when the eye tracking input channel fails to meet a criteria, the neuromuscular sensor input channel, hand-held controller input channel, or a combination of these can be selected for indirect interaction user input. For example, a ray that extends from the user's tracked lower arm (e.g., virtual ray) can support indirect user interactions with a XR environment. In some implementations, when the input channel for indirect user interactions is changed from the eye tracking input channel to the neuromuscular sensor input channel and/or hand-held controller input channel, the input channel(s) selected for other types of user input, such as select, scroll, etc. can also be changed. For example, eye tracking combined with hand tracking can be an effective combination for indirect user interactions and selection and/or scroll user input. However, when indirect user interactions are provided via a ray extended from the user's tracked lower arm, other input channels may more effectively combine with the neuromuscular sensor input channel and/or hand-held controller input channel. For example, user selection input and/or user scroll input can be provided via hand-held controller input (e.g., button presses, joystick input, etc.), touch input (e.g., when a controller devices includes a trackpad), and/or gestures via the tracked lower arm (e.g., hand movements via the wrist, such as side-to-side, up and down, wrist flick, etc.). Accordingly, the deterioration of the eye track input channel fidelity can cause selection of a different input channel for indirect user interactions, and this change can trigger selection of one or more different input channels for other types of user interaction (e.g., user selection, user scroll, etc.).

Figure 6:
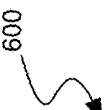
FIG. 6 is a diagram illustrating a wristband input device of an artificial reality system.
Figure 6:
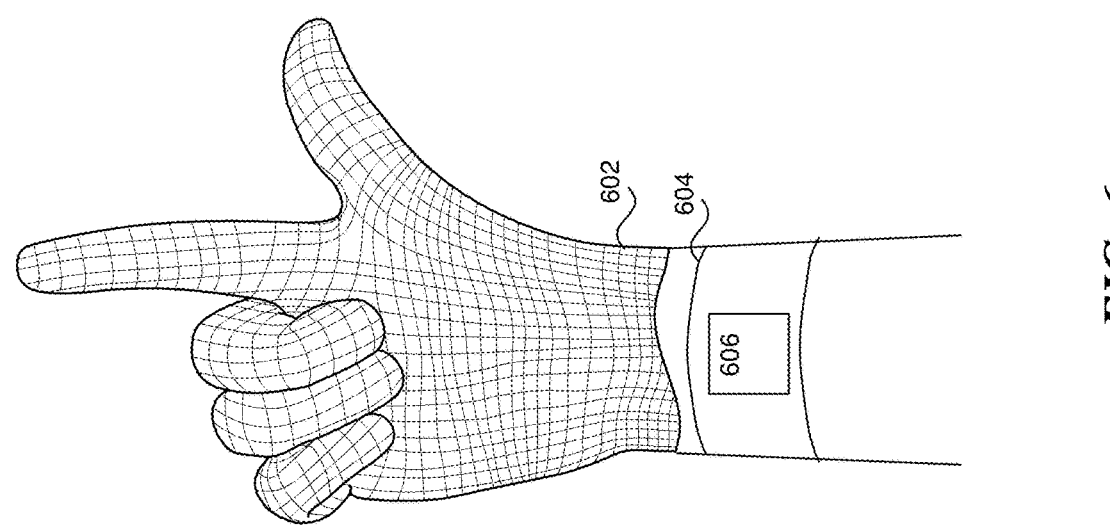

FIG. 6 is a diagram illustrating a wristband input device of an artificial reality system. Diagram 600 includes lower arm 602, band 604, and neuromuscular sensor(s) 606. For example, lower arm 602 can be the lower arm (e.g., lower forearm, wrist, and hand) of a user that wears band 604. Band 604 can be a wristband that is configured to connect to a XR system and provide sensor input signals. Neuromuscular sensor(s) 606 can be one or more neuromuscular sensors, such as wrist electromyography (EMG) sensor(s) that are positioned on band 604 such that the sensor(s) contact the skin and generate neuromuscular signals from lower arm 602 when worn by the user.

Some implementations of band 604 include at least one IMU (not depicted) and a plurality of neuromuscular sensor(s) 606. For example, the IMU(s) and neuromuscular sensor(s) 606 may be arranged to detect movement of different parts of the human body, such as the wrist. The IMU(s) and neuromuscular sensor(s) may be arranged in any suitable way, and embodiments of the technology described herein are not limited based on the particular sensor arrangement. For example, in some implementations, at least one IMU and a plurality of neuromuscular sensor(s) 606 may be co-located on a body segment (e.g., lower arm 602) to track movements of body segment using different types of measurements. In one implementation, a plurality of EMG sensors are arranged on a wearable device configured to be worn around lower arm 602. In such an arrangement, the EMG sensors may be configured to determine movement information associated with wrist or hand segments to determine, for example, whether the user has an open or closed hand configuration.

Each of IMU(s) and neuromuscular sensor(s) 606 include one or more movement sensing components configured to sense movement information. In the case of IMUs, the movement sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensor(s) 606, the movement sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In one implementation, multiple EMG sensors (e.g., four, eight, ten, sixteen, etc.) are arranged circumferentially around an elastic band configured to be worn around lower arm 602. It should be appreciated that any suitable number of neuromuscular sensor(s) 606 may be used and the number and arrangement of neuromuscular sensor(s) 606 used may depend on the particular application for which the wearable device is used. For example, a wearable armband or wristband (e.g., band 604) may be used to generate control signals for controlling throwing a ball by an avatar in a computer-generated virtual reality environment, whereas a wearable leg or ankle band may be used to generate control signals for controlling kicking a ball by the avatar.

In some embodiments, a XR system may be configured to communicate with IMU(s) and/or neuromuscular sensor(s) 606, for example to calibrate the sensors prior to measurement of movement information. For example, a wearable device may be positioned in different orientations on or around a part of a user's body and calibration may be performed to determine the orientation of the wearable device and/or to perform any other suitable calibration tasks. Calibration of sensor(s) may be performed in any suitable way, and embodiments are not limited in this respect. For example, in some implementations, a user may be instructed to perform a particular sequence of movements and the recorded movement information may be matched to a template by virtually rotating and/or scaling the signals detected by the sensors (e.g., by the electrodes on EMG sensors). In some implementations, calibration may involve changing the gain(s) of one or more analog to digital converters (ADCs), for example, in the case that the signals detected by the sensors result in saturation of the ADCs.

Implementations of a XR system also include one or more controllers configured to receive a control signal. One or more trained models can be configured to generate control signals determined based, at least in part, on signals recorded by IMU(s) and/or neuromuscular sensor(s) 606 worn by a user. One or more control signals determined based on the output of the trained model(s) may be sent to the one or more controllers to control one or more operations of a device associated with the controller. In some implementations, the controller(s) include a pose estimation that maps the control signals to a particular body part pose (e.g., determining a kinematic model of the user's hand based on the control signals), thereby determining a representation of the user's body or a graphical representation of a character based on the provided control signals. In various implementations, such trained models may be trained using data that pairs signals from IMU(s) and/or neuromuscular sensor(s) with known pose data—e.g., measured by a glove, camera, or sensor system. This paired data can then be used with the signals from IMU(s) and/or neuromuscular sensor(s) as model input and the known pose data as comparison data used with a loss function to update model parameters and thereby train the model.

Non-limiting examples of applications of some embodiments of the techniques described herein include menu navigation, buttons, dials, levers, selection of items, typing without a physical keyboard or keypad in either a desktop or mobile setting, cut/paste operations for document editing, cursor control, scrolling and volume control. Non-limiting examples of applications further include mechanisms for controlling non-visual user interfaces, such as auditory or tactile menus or games. Non-limiting examples of applications also include systems for facilitating gestural communication between people and manipulation of higher dimensional data, such as three-dimensional and rotational data. Non-limiting examples of applications still further include wake and unlock gestures for phones and computers, biometric codes and keys, and home appliance controls.

As a user interacts with a XR environment (e.g., a user-interactive program), sensor data is collected by worn sensors. The collected sensor data and the user's interaction with the XR system enables the system to learn how to modify the mapping between the recorded sensor signal and control signals sent to the controllers. In this way, the signals recorded by the wearable sensors are used to both control a device and facilitate learning by the control system to map the user's body movements to intended actions.

Figure 7:
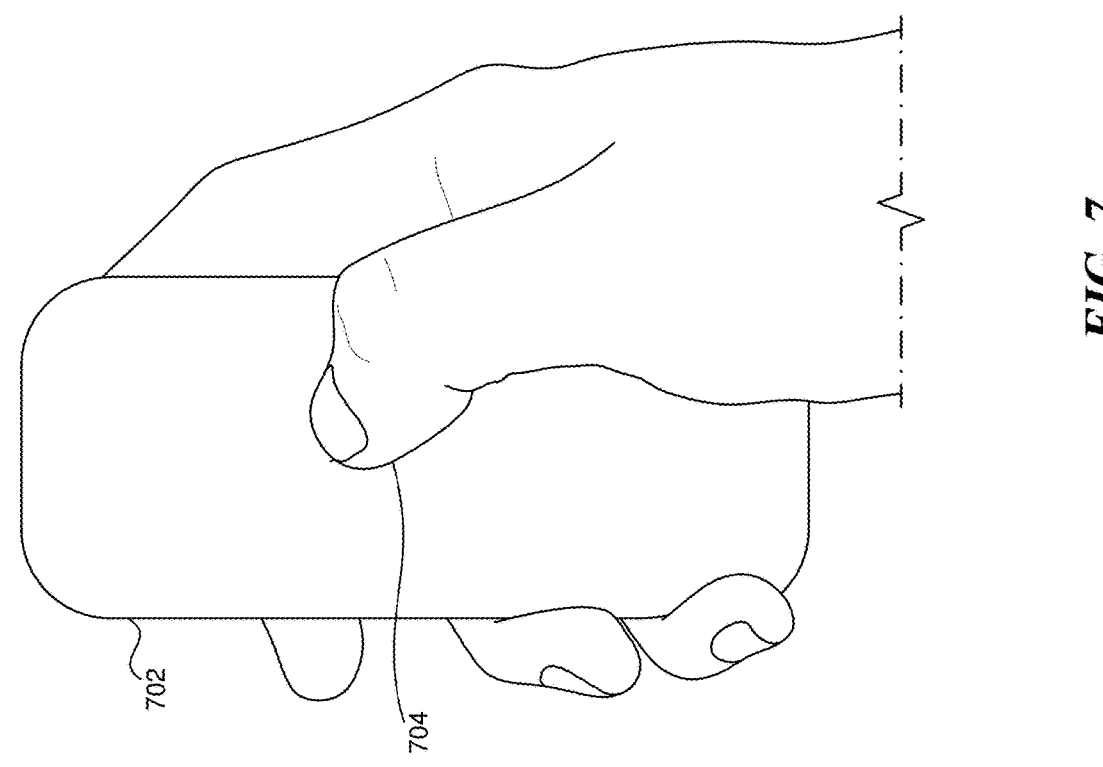
FIG. 7 is a diagram illustrating a touch input device of an artificial reality system.

FIG. 7 is a diagram illustrating a touch input device of an artificial reality system. Diagram 700 includes user 702 and touch device 704. For example, touch device 704 can include a trackpad configured to sense touch input from a user and provide sensor signals to a XR system. In some implementations, touch device 704 can include IMU sensors and/or processor(s) that permit motion/movement tracking of touch device 704, such as tracking in 3DoF or 6DoF. In this example, touch device 704 can comprise a hand-held controller and support both a hand-held controller input channel (e.g., motion tracking) and a touch based input channel (e.g., trackpad input). For example, user interactions with touch device 704 can comprise input for the touch input channel, the hand-held controller input channel, or any combination thereof.

Figure 8:
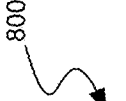
FIG. 8 is a conceptual diagram of an artificial reality environment with display elements for performing passive eye tracking calibration.
Figure 8:
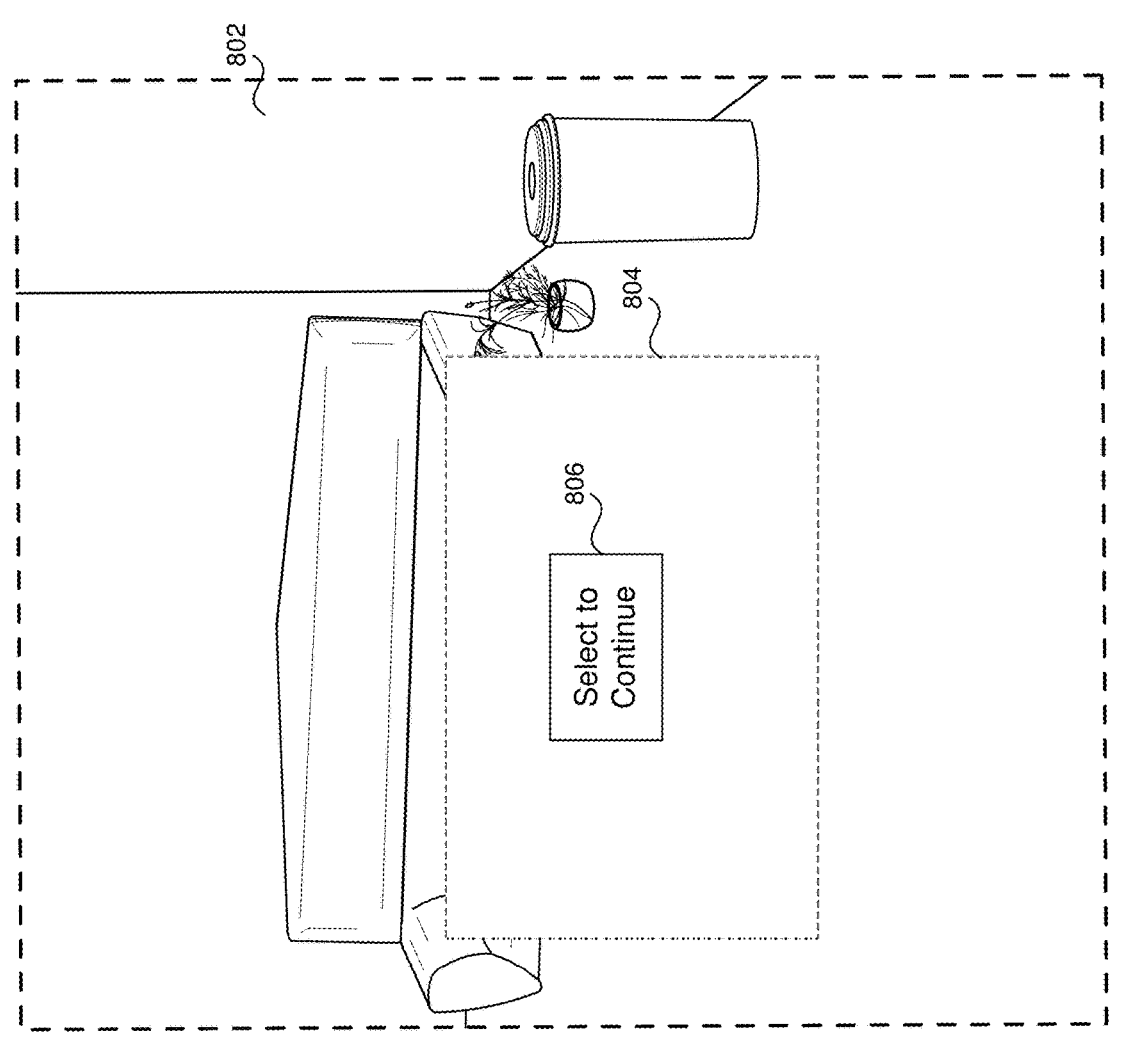

FIG. 8 is a conceptual diagram of a XR environment with display elements for performing passive eye tracking calibration. XR environment 800 includes background 802, virtual object 804, and user interface element 806. In some implementations, XR environment 800 displays virtual object 804 (e.g., a two-dimensional virtual object, such as a panel) against background 802 to perform a user workflow within the normal operation of the XR system, such as setting user preferences, selecting an application/game to launch, navigating a menu, etc.

Virtual object 804 comprises a layout (e.g., user interface element 806) that is conducive to a passive calibration of eye tracking parameters. For example, eye tracking parameters can include weights and/or numeric values that are used by an eye tracking model to resolve eye tracking (e.g., signals that represents the user's eye location in an eye box) for indirect interactions with a XR environment, such as controlling a cursor. Calibration parameters can degrade over time and/or when operating conditions for a XR system are changed. Accordingly, updates to the calibration parameters can improve eye tracking performance.

Passive calibration of eye tracking parameters can be performed when the user is looking at a known location in a XR environment during eye tracking. In active calibration, a user can be instructed to look at certain portions of a XR environment. On the other hand, XR environment 800 can include a virtual object 804 with a limited number of items, such as one or few user interface elements, with known locations. In the illustrated example, virtual object 804 includes a single user interface element 806. Because of the simplified layout, it can be assumed that a user intends to target user interface element 806 when a resolved location from the eye tracking is within a threshold distance from user interface element 806. For example, when the resolved user's gaze settles at this location for a duration of time and/or the resolved user's gaze is at this location when the user provides a selection input, it can be assumed that the user intends to target user interface element 806. Based on the known location of user interface element 806, the known location of the resolved user's gaze, and the distance between these, an error can be calculated for the eye tracking calibration parameters. Passive calibration can update the eye tracking parameters based on this calculated error.

In some implementations, passive calibration can use the calculated error to correct the eye calibration parameters when a user does not revert the selection of user interface element 806. For example, because of the simplified display of virtual object 804, passive eye tracking assumes the intent of the user. If the user reverts the selection, this assumed intent does not hold. If the user maintains the selection, the assumed intent can be relied upon to correct the eye calibration parameters. In some implementations, the passive eye tracking calibration workflow operates in the background without explicit user instruction to select user interface element 806.

In some implementations, in response to deterioration in eye tracking input channel fidelity, performance of a mitigation workflow can include altering the display provided to the user by the XR system to incorporate a user interface that corresponds to a passive eye tracking calibration. For example, under normal operating conditions, a first user interface that permits a user to navigate a menu for the XR system (e.g., to select an application or game to launch, change user preferences, etc.) can be displayed to the user, and, in response to deterioration of the eye tracking input channel fidelity, a second user interface that permits the user to navigate a menu for the XR system can be displayed to the user.

In some implementations, the first user interface and second user interface can permit similar functionality (e.g., selection of an application or game to launch, saving or editing user preferences, etc.), however the second user interface can be a simplified version of the first user interface that corresponds to passive eye tracking calibration. For example, where the first user interface may include three, four, or more virtual buttons on a given display panel, the second user interface can display one or two virtual buttons on the display panel. In another example, the virtual buttons displayed on the panel of the first user interface can be a first distance apart, while the virtual buttons displayed on the panel of the second user interface can be a second distance apart, where the second distance is greater than the first distance. In these examples, the second user interface presents a higher level of likelihood that the passive eye tracking calibration will successfully predict user selection of a virtual button, and thus improves the performance of the passive eye tracking calibration. In some implementations, the second user interface may correspond to a longer user workflow (e.g., a larger number of user selections), and thus the second user interface can be triggered temporarily and for a specific purpose, such as improving the eye tracking input channel fidelity.

Those skilled in the art will appreciate that the components illustrated in FIGS. 1-4, 5A, 5B, 5C and 6-10 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 9:
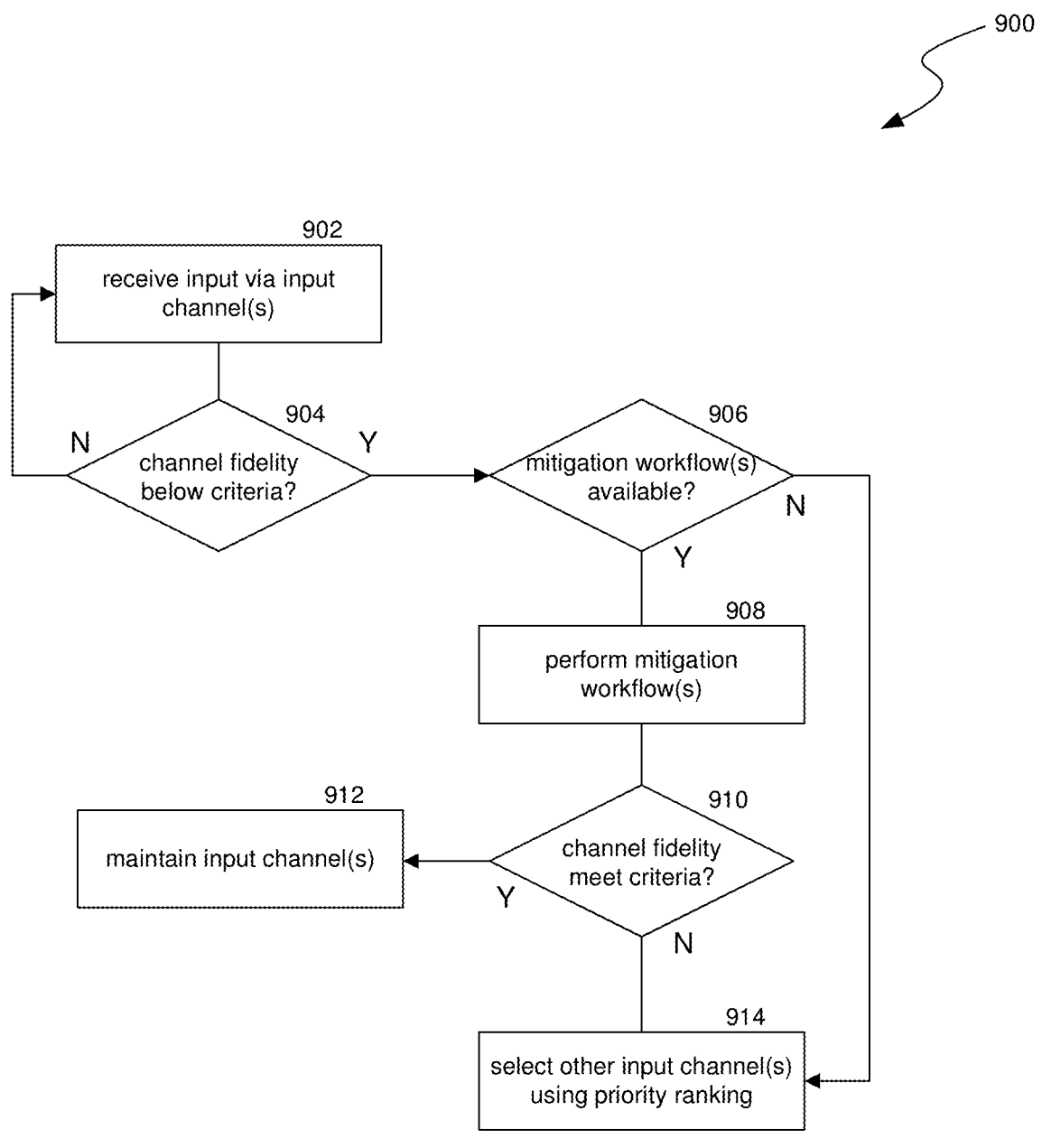
FIG. 9 is a flow diagram illustrating a process used in some implementations of the present technology for mitigating a degradation in input channel fidelity at an artificial reality system.

FIG. 9 is a flow diagram illustrating a process used in some implementations of the present technology for mitigating a degradation in input channel fidelity at an artificial reality system. In some implementations, process 900 can be initiated in response to signals received at an artificial realty system, such as signals detected/received via one or more input devices relative to one or more input channels (e.g., eye tracking input, hand tracking input, neuromuscular sensor input, hand-held controller input, trackpad input, head gaze input, voice input, etc.). Example triggers include: a connection established or lost for an input device, input channel fidelity deterioration, changes to environment conditions, any combination thereof, or any other suitable trigger conditions.

At block 902, process 900 can receive user input via user input channel(s). One or more user input channels can be selected as the primary input channel for one or more types of user input, such as direct interaction user input (e.g., controlling collider objects), indirect interaction user input (e.g., driving a cursor in a XR environment), select user input, wake user input (e.g., wake XR system from inactive made, such as sleep, to active mode), scroll user input, pan user input (e.g., two-dimensional movement), and/or move user input (e.g., three-dimensional movement). Example user input channels include eye tracking, computer vision hand tracking, neuromuscular sensor signal detection and lower arm tracking, hand-held controller movement tracking, touch-based input tracking (e.g., trackpad input), head gaze tracking, voice input, any combination thereof, or any other suitable input channel.

In some implementations, one or more user input types can comprise a priority ranking for input channel and/or one or more rules for selecting an input channel for the user input type. For example, a ranking for indirect interaction user input, from highest to lowest, can include eye tracking, hand-held controller in combination with neuromuscular sensor, and head gaze. In this example, when each of these input channels comprises a fidelity that meets a corresponding fidelity criteria, the eye tracking input channel is selected for indirect interaction user input. If eye tracking fidelity fails to meet the eye tracking criteria, a hand-held controller in combination with neuromuscular sensor input channel (e.g., ray input extended from a wrist of the user's avatar) can be selected. Other suitable input types can comprise a similar ranking.

At block 904, process 900 can determine whether channel fidelity for one or more input channels fails to meet a criteria. For example, eye tracking input channel fidelity may degrade over time and/or operating conditions at a XR system may change, leading to a degradation in eye tracking performance. In some implementations, eye tracking performance can fail to meet the eye tracking criteria when one or more eye tracking model(s) (e.g., machine learning models, etc.) output a confidence value below a threshold, resolved eye tracking is intermittent, resolved eye tracking includes fluctuations that exceed a variance criteria, and the like. Similarly, other input channel fidelities can be compared to corresponding criteria to determine whether any input channel selected for an input type has experienced a degradation state such that its performance fails to meet a corresponding criteria.

When it is determined that channel fidelity for one or more input channels fails to meet the criteria, process 900 can progress to block 906. When it is determined that channel fidelity for one or more input channels meets the criteria, process 900 can loop back to block 902, where user input via user input channel(s) continues to be received until a channel fidelity fails to meet the criteria.

At block 906, process 900 can determine whether mitigation workflow(s) are available for the input channel(s) with a channel fidelity that fails to meet the criteria. For example, a mitigation workflow for the eye tracking input channel includes active calibration, passive calibration, and one or more user instruction workflows. Other input channels can include other suitable mitigation workflow(s).

When it is determined that mitigation workflow(s) are available for the input channel(s) with a channel fidelity that fails to meet the criteria, process 900 can progress to block 908. When it is determined that mitigation workflow(s) are not available for the input channel(s) with a channel fidelity that fails to meet the criteria, process 900 can progress to block 914.

At block 908, process 900 can perform available mitigation workflow(s). For example, when the eye tracking input channel comprises a fidelity that fails to meet the corresponding criteria, a performed mitigation workflow can include: active calibration, passive calibration, and/or user instruction workflows. In active calibration, the user can be instructed to look at known location(s) in a XR environment, and eye tracking calibration parameters can be corrected in response to an error detected between the known location(s) and the resolved eye tracking. In passive calibration, the user can perform a normal workflow, such as navigating a menu, that includes the user predictably looking at known location(s) of user interface element(s), and eye tracking calibration parameters can be corrected in response to an error detected between the known location(s) and the resolved eye tracking.

User instruction workflows can provide the user instructions via dialogues that instruct the user to perform certain actions that improve eye tracking performance. Other suitable mitigation workflows can be performed for other input channels with a fidelity that fails to meet a corresponding criteria.

At block 910, process 900 can determine whether the channel fidelity for input channel(s) improved such that one or more of them meet corresponding fidelity criteria. For example, where the eye tracking input channel comprised a fidelity that failed to meet its criteria, after performance of one or more mitigation workflows the fidelity can be re-compared to the criteria to determine wither the mitigation workflow improved the channel fidelity. Any other suitable input channel can be re-compared to its corresponding criteria after performance of one or more mitigation workflows.

When it is determined that the channel fidelity for input channel(s) improved such that one or more of them meet corresponding fidelity criteria, process 900 can progress to block 912. When it is determined that channel fidelity for input channel(s) did not improve such that one or more of them meet corresponding fidelity criteria, process 900 can progress to block 914.

At block 912, process 900 can maintain the selection(s) for the input channel(s) with an improved channel fidelity that meets its corresponding criteria. For example, when the eye tracking mitigation workflow improves the eye tracking input channel fidelity such that it meets a corresponding eye tracking criteria, the eye tracking input channel can be maintained as the selection for one or more input types (e.g., indirect interaction user input). The selection(s) of any other suitable input channel(s) that comprise an improved channel fidelity that meets its corresponding criteria can be maintained for input type(s).

At block 914, process 900 can select one or more different input channel(s) to replace the input channel(s) with a fidelity that failed to meet corresponding criteria. For example, when the eye tracking input channel fidelity fails to meet its corresponding eye tracking criteria after performance of mitigation workflow(s), one or more other input channels can be selected for input types, such as indirect interaction user input and/or any other suitable user input type with eye tracking as the selected channel.

In some implementations, a given input type can comprise a ranking for input channel selection. For example, a ranking for indirect interaction user input, from highest to lowest, can include eye tracking, hand-held controller in combination with neuromuscular sensor, and head gaze. In the example where eye tracking experiences degradation, hand-held controller in combination with neuromuscular sensor (e.g., ray-based interactions) can be selected for the indirect interaction user input. If one or more of the hand-held controller or neuromuscular sensor input channels also experiences channel fidelity degradation, head gaze can be selected for the indirect interaction user input. The selection(s) of any other suitable input channel(s) that comprise a channel fidelity that fails to meet its corresponding criteria can be performed according to ranking(s) for types of user input.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method comprising:

detecting, for a first input channel of a plurality of input channels, a channel fidelity that fails to meet a fidelity criteria, the plurality of input channels comprising two or more of an eye tracking input channel, wrist electromyography (EMG) signal input channel, computer vision hand tracking input channel, hand-held controller input channel, and trackpad touch input channel, wherein the plurality of input channels provide user input from a user to an artificial reality system; and in response:

performing a mitigation workflow configured to improve the channel fidelity for the first input channel, the mitigation workflow comprising a guided user workflow, a calibration workflow for the first input channel, or a combination thereof; and selecting one or more primary input channels from among the plurality of input channels, wherein the first input channel is selected as the one or more primary input channels when it is determined that the channel fidelity of the first input channel meets the fidelity criteria after performance of the mitigation workflow, and wherein one or more of the plurality of input channels other than the first input channel are selected as the one or more primary input channels when it is determined that the channel fidelity of the first input channel fails to meet the fidelity criteria after performance of the mitigation workflow.

2. The method of claim 1, wherein an ordered priority is predefined for the plurality of input channels, and the one or more of the plurality of input channels other than the first input channel are selected as the one or more primary input channels according to the ordered priority.

3. The method of claim 1, wherein the first input channel comprises the eye tracking input channel and the mitigation workflow comprises an eye tracking calibration workflow.

4. The method of claim 3, wherein the artificial reality system displays an artificial reality environment to the user, and the eye tracking calibration workflow comprises:

receiving an eye tracking input relative to one or more known locations of one or more user interface elements displayed to the user via the artificial reality system;

resolving the eye tracking input;

selecting one of the one or more user interface elements with the one or more known locations in response to the resolved eye tracking input being a first distance from a known location of the selected user interface element; and correcting one or more calibration parameters using the first distance as an estimated error.

5. The method of claim 4, wherein the one or more calibration parameters are corrected in response to the user continuing to interact with the artificial reality system without reverting the selection of the one of the one or more user interface elements.

6. The method of claim 4, wherein the eye tracking calibration workflow comprises a passive calibration workflow that operates in a background without explicit user instruction to select the one of the one or more user interface elements.

7. The method of claim 1, wherein the mitigation workflow comprises a guided user workflow that instructs the user to adjust eyeglasses worn by the user.

8. The method of claim 1, wherein the one or more of the plurality of input channels other than the first input channel selected as the one or more primary input channels comprises at least the computer vision hand tracking input channel.

9. The method of claim 1, wherein the one or more of the plurality of input channels other than the first input channel selected as the one or more primary input channels comprises at least the trackpad touch input channel, the hand-held controller input channel, or any combination thereof.

10. The method of claim 1, wherein the selected one or more primary input channels control interactions between the user and an artificial reality environment displayed to the user via the artificial reality system.

11. A non-transitory computer-readable storage medium storing instructions that, when executed by a computing system, cause the computing system to perform a process, the process comprising:

detecting, for a first input channel of a plurality of input channels, a channel fidelity that fails to meet a fidelity criteria, the plurality of input channels comprising two or more of an eye tracking input channel, wrist electromyography (EMG) signal input channel, computer vision channel hand tracking input channel, hand-held controller input channel, trackpad touch input channel, or any combination thereof, wherein the plurality of input channels provide user input from a user to an artificial reality system; and in response:

performing a mitigation workflow configured to improve the detected channel fidelity, the mitigation workflow comprising a guided user workflow, a calibration workflow for the first input channel, or a combination thereof; and selecting one or more primary input channels from among the plurality of input channels,

25 wherein the first input channel is selected when it is determined that the channel fidelity meets the fidelity criteria after performance of the mitigation workflow, and wherein one or more of the plurality of input channels other than the first input channel are selected when it is determined that the channel fidelity fails to meet the fidelity criteria after performance of the mitigation workflow.

12. The non-transitory computer-readable storage medium of claim 11, wherein an ordered priority is predefined for the plurality of input channels, and one or more input channels other than the first input channel are selected as the one or more primary input channels according to the ordered priority.

13. The non-transitory computer-readable storage medium of claim 11, wherein the first input channel comprises an eye tracking input channel and the mitigation workflow comprises an eye tracking calibration workflow.

14. The non-transitory computer-readable storage medium of claim 13, wherein the artificial reality system displays an artificial reality environment to the user, and performance of the eye tracking calibration workflow comprises:

receiving an eye tracking input relative to one or more known locations of one or more user interface elements displayed to the user via the artificial reality system;

resolving the eye tracking input;

selecting one of the one or more user interface elements with the one or more known locations in response to the resolved eye tracking input being a first distance from a known location of the selected user interface element; and correcting one or more calibration parameters using the first distance as an estimated error.

15. The non-transitory computer-readable storage medium of claim 14, wherein the one or more calibration parameters are corrected in response to the user continuing to interact with the artificial reality system without reverting the selection of the one of the one or more user interface elements.

16. The non-transitory computer-readable storage medium of claim 14, wherein the eye tracking calibration workflow comprises a passive calibration workflow that operates in a background without explicit user instruction to select the one of the one or more user interface elements.

17. The non-transitory computer-readable storage medium of claim 13, wherein the mitigation workflow comprises a guided user workflow that instructs the user to adjust eyeglasses worn by the user.

18. The non-transitory computer-readable storage medium of claim 11, wherein the one or more input channels selected as the one or more primary input channels comprise at least a computer vision hand tracking input channel.

19. The non-transitory computer-readable storage medium of claim 11, wherein the one or more input channels selected as the one or more primary input channels comprise a trackpad touch input, a hand-held controller input channel, or any combination thereof.

20. A computing system, the computing system comprising:

one or more processors; and one or more memories storing instructions that, when executed by the one or more processors, cause the computing system to perform a process comprising:

detecting, for a first input channel of a plurality of input channels, a channel fidelity that fails to meet a fidelity criteria, the plurality of input channels comprising two or more of an eye tracking input channel, wrist electromyography (EMG) signal input channel, computer vision channel hand tracking input channel, hand-held controller input channel, trackpad touch input channel, or any combination thereof, wherein the plurality of input channels provide input to an artificial reality system from a user; and in response:

performing a mitigation workflow configured to improve the channel fidelity for the first input channel, the mitigation workflow comprising a guided user workflow, a calibration workflow for the first input channel, or a combination thereof; and selecting one or more primary input channel from among the plurality of input channels, wherein, the first input channel is selected when it is determined that the channel fidelity meets the fidelity criteria after performance of the mitigation workflow, and one or more of the plurality of input channels other than the first input channel are selected when it is determined that the channel fidelity fails to meet the fidelity criteria after performance of the mitigation workflow.

* * * * *